INVENTOR
Albert N Cramer

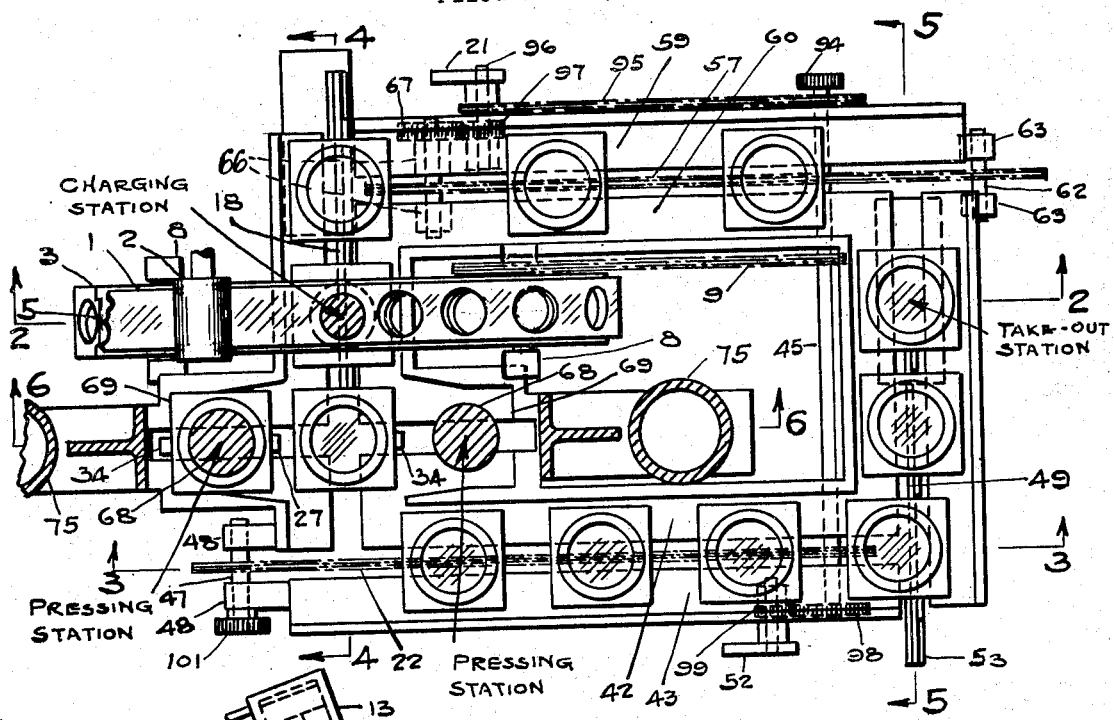
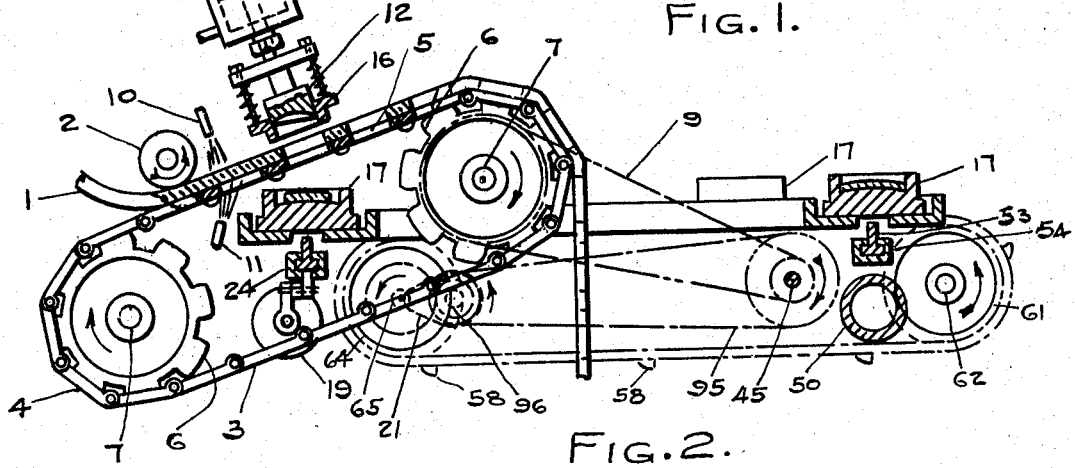
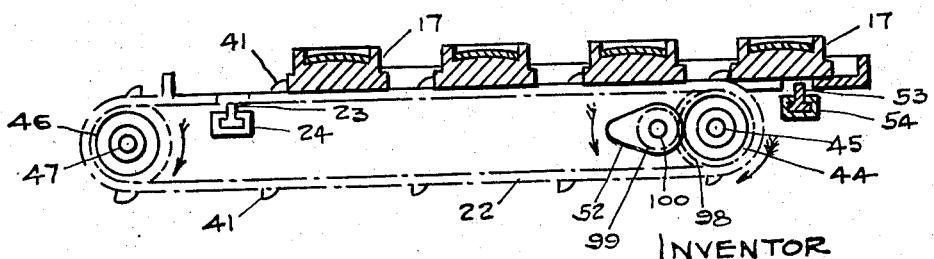

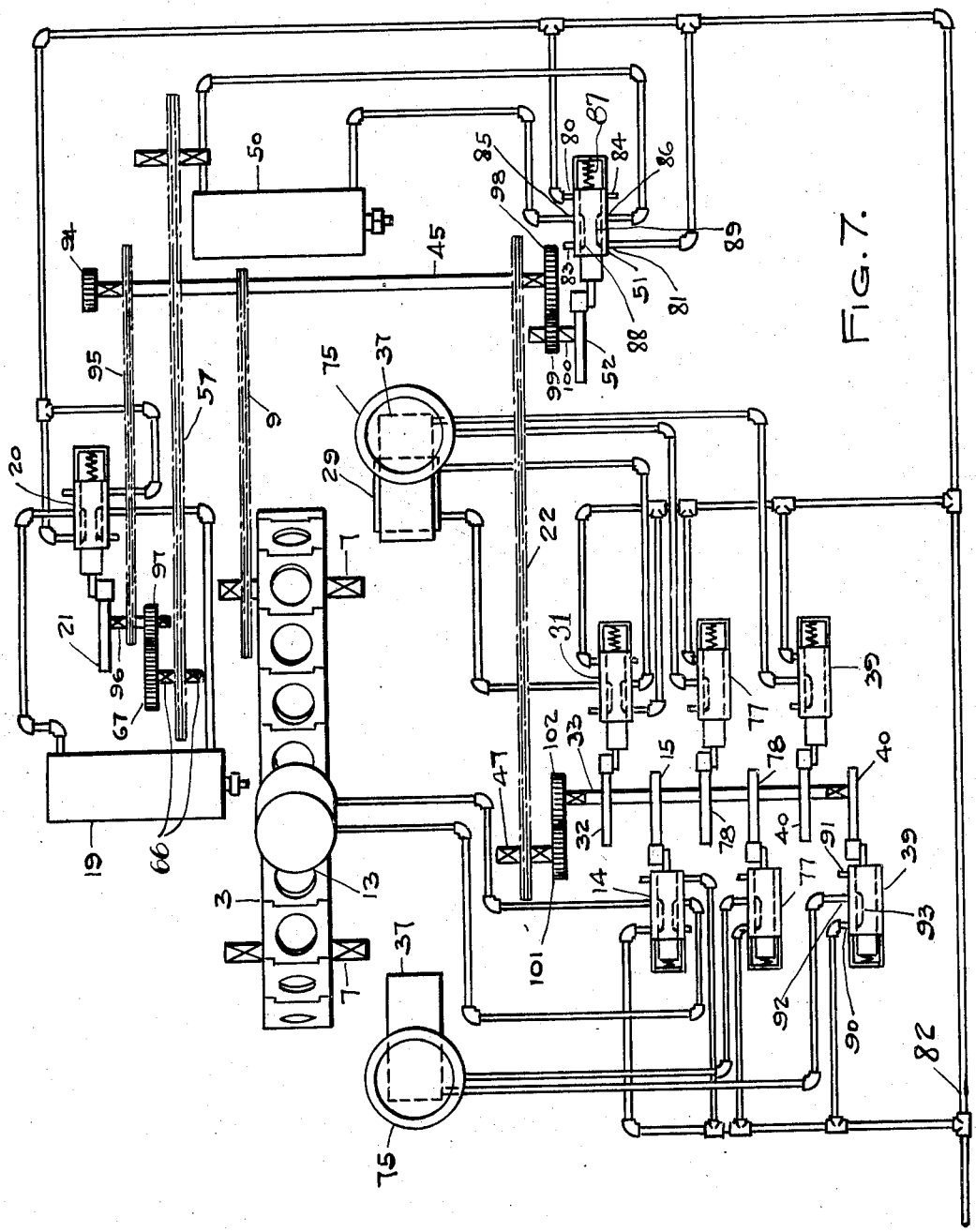

Patented June 30, 1936

2,045,699

UNITED STATES PATENT OFFICE 2,045,699

PROCESS AND MACHINE FOR FORMING GLASS ARTICLES

Albert N. Cramer, Toledo, Ohio, assignor to Alice B. Cramer, Toledo, Ohio

Application June 3, 1932, Serial No. 615,244

18 Claims. (Cl. 49—35)

The present invention relates to improvements in processes and machines for forming glass articles, such as may be formed in molds from punchings obtained from a strip of plastic glass. It relates particularly to expanding the surfaces of the punchings, during the pressing operation in the mold, to produce an article with clear and transparent surfaces.

The customary method of pressing articles from a strip of plastic glass, as shown in my co-pending application Serial No. 565,564 and in the patent to Gelstharp 1,471,725, is to punch a measured portion from the strip and to continue the movement of the punch in order to form glass articles of the same size as the punch. Such method has noteworthy defects, including the following: First, the pressing time is limited and is insufficient to properly form certain classes of ware. Second, the punching is the same size as the mold, and there is insufficient movement of the surfaces of the punchings to produce a clear surface on the finished article. This is particularly true when the strip is formed by a rolling operation, rather than an upward drawing operation.

One of the objects of this invention is to provide mechanism, for pressing the punchings from a strip of plastic glass, that is so arranged that the duration of the pressing operation may be prolonged, to suit the article being made, over a period of time greater than between successive punchings.

Another object is to provide mechanism, for pressing punchings from a strip of plastic glass, that is so constructed that the surfaces of the punchings may be materially expanded during the pressing operation; whereby surface blemishes, which may have been produced in forming the strip, may be dispersed in the pressing operation.

Another object is to provide means for reheating the surfaces of that portion of the strip of plastic glass from which the punchings are obtained, prior to the actual punching operation. Thus, the surface skin is softened and the surface tension, produced by the strip forming operation, is removed from the punching prior to the pressing operation. This facilitates the production of a more transparent surface on the finished article.

Another object is to form the glass articles by means of a plunger independent of the punch, whereby the contour of the finished article will not govern the shape of the cutting edge of the punch.

Other objects will be apparent hereinafter.

In the accompanying drawings:

Figure 1 is a plan view of my preferred device.

Figure 2 is a sectional view in elevation, along the lines 2—2 of Figure 1, and shows particularly the mechanism provided for removing the measured portions from the strip of plastic glass.

Figure 3 is a sectional view in elevation, along the lines 3—3 of Figure 1, and shows particularly one of the conveyors for moving the molds.

Figure 7 is a plan view, showing diagrammatically the driving mechanism and the air motors with their control valves.

Figure 4:
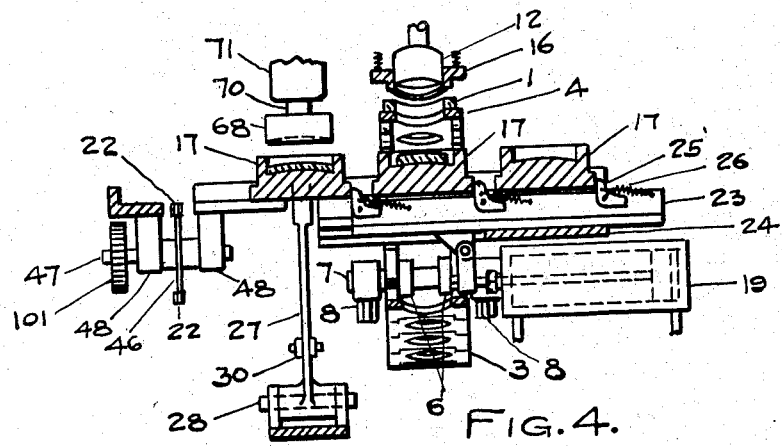
Figure 4 is a sectional view in elevation, along the lines 4—4 of Figure 1.
Figure 5:
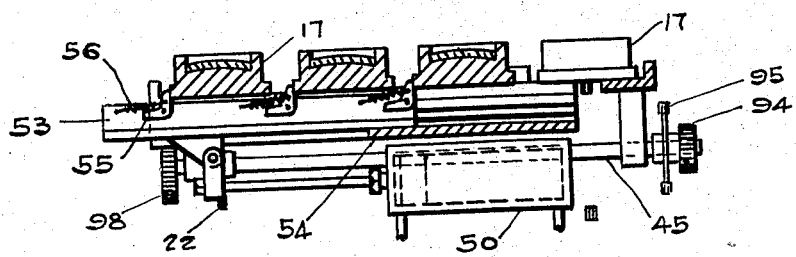
Figure 5 is a sectional view in elevation, along the lines 5—5 of Figure 1.

The mechanism, as shown in Figures 1 to 7 of the drawings, comprises a carrier for a strip of plastic glass and a punch co-acting with the carrier to remove measured portions from the strip. Mold portions are positioned to receive these punchings and are moved successively and sequentially, by suitable conveyor mechanisms, through lineal pathways to the pressing and take-out stations. Two pressing stations are provided and alternate molds are delivered to each of these stations, to provide the time for prolonged pressing, required in certain classes of articles.

The strip of plastic glass 1 is formed in any suitable manner, not shown, and is guided by the roller 2 to the strip carrier 3, which comprises a plurality of hinged carrier plates 4, with openings 5 therein, carried by the sprockets 6 secured to the shafts 7 mounted in bearings 8. In the form, as shown in the accompanying drawings, the carrier 3 is continuously driven by the chain drive 9; however, if desired, the carrier may be driven with an interrupted movement to provide a period of rest during the punching operation.

Adjacent the roller 2 is positioned a heating element 10, adapted to direct a heating medium towards the top surface of the strip of plastic glass; and beneath the element 10 and below the upper strand of the carrier 3 is another heating element 11, adapted to direct a heating medium, through the openings 5 of the carrier 3, towards the bottom surface of the strip of plastic glass. This reheating process combines with the natural reheating process of the plastic glass to remove surface tension, which may have been introduced into the strip during the strip forming process.

The punch 12 is positioned perpendicularly to the carrier 3 to co-act therewith and is actuated by the air motor 13 controlled by the valve 14 actuated by the cam 15, which is so constructed that the air motor is reversed immediately the punching action is completed. Resiliently mounted on the punch 12 is an annular ring 16 positioned to engage the surface of the strip of glass and securely clamp it prior to the punching operation. Thus, a clean cut is facilitated, as the tendency of the plastic glass to be drawn over the edges of the openings 5 is overcome. The cutting edge of the punch 12, shown in the drawings, is constructed so that the punching action starts at one side of the opening 5 and extends progressively around the periphery of the opening, in order to further insure a clean cut. The carrier 3 is inclined upwardly in order that the punching may drop to the mold base while substantially in a horizontal plane, even though one portion of the punching is completely severed from the strip before the opposite portion is severed.

As shown, in Figure 4 of the drawings, when the punching has been dropped to the mold base 17 the cross-conveyor 18 is actuated by the double acting air motor 19 controlled by the valve 20 actuated by the cam 21, and the mold base is moved from the charging station to a position intermediate the two presses. Simultaneously the conveyor 18 moves the succeeding mold base into the charging position and the preceding mold base from the position between the presses into the path of the conveyor 22. The conveyor 18 comprises a horizontally disposed slide member 23 attached to the movable portion of the air motor 19 and suitably guided by the guide member 24. Pivotally mounted on the slide 23 are a number of upwardly projecting fingers 25 adapted to engage the mold base 17 when the slide is actuated in the forward direction, and when the slide is moved in the reverse direction the fingers 25 contact with the mold base and pivot to pass beneath it, while the springs 26 are adapted to return them to mold engaging position when such passage is completed. The cam 21 is so constructed that, as soon as the slide has completed its forward movement, the air motor 19 is reversed and the slide is returned to its initial position.

Figure 6:
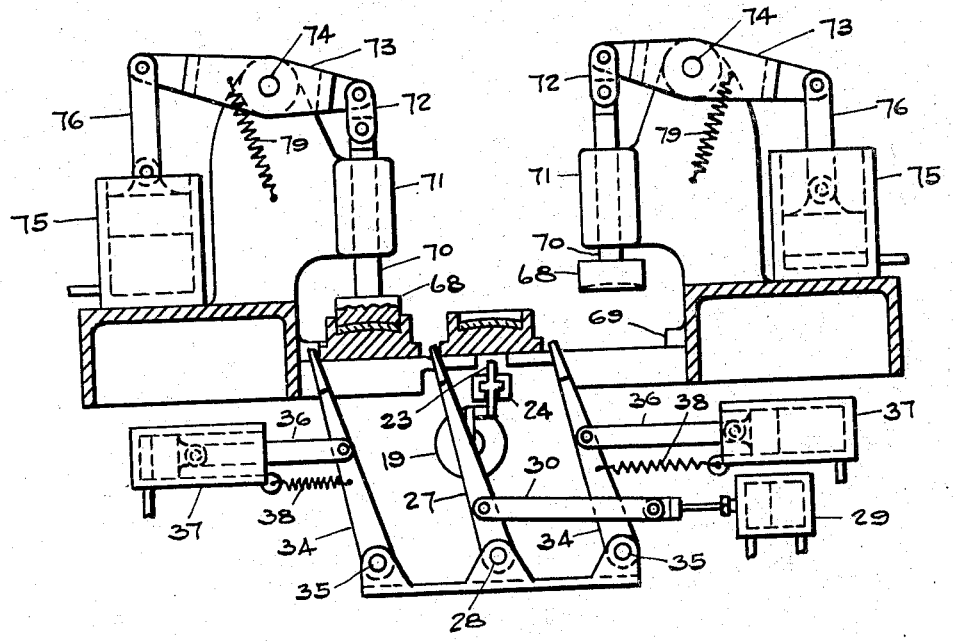
Figure 6 is a sectional view in elevation, along the lines 6—6 of Figure 1, and shows particularly the pressing stations.

As shown in Figure 6 of the drawings, the mechanism provided for selectively distributing the series of mold bases 17 to the pressing stations, comprises a vertically disposed lever 27 with its upper end adapted to engage the mold bases and its lower end pivoted at 28 and actuated by the double acting air motor 29, by means of the connecting link 30. The control valve 31 of the air motor 29 is actuated by the cam 32 secured to the shaft 33, which is rotated at the speed of one-half revolution for each punching delivered at the charging station. The cam 32 is so constructed that the motor 29 is reversed each one-half revolution of the shaft 33, and the lever 27 is oscillated back or forth each one-half revolution of the shaft. Thus, mold bases are moved to alternate presses at each one-half revolution of the shaft 33. The cam 32 is so positioned on the shaft 33 that the lever 27 is moved immediately the slide 23 has been withdrawn from its path of oscillation, as previously described.

For removing the mold bases 17 from the presses, there are provided two duplicate units positioned to operate in opposed directions, one to remove the mold bases from each press. These units each comprises a vertically positioned lever 34, whose upper end is adapted to engage the mold bases, and whose lower end is fulcrumed at 35. Intermediate its ends is attached the link 36 controlled by the single acting air motor 37, which is actuated in the forward movement by air under pressure, and is returned to its initial position, when the air is released, by the tension spring 38, one end of which is attached to the lever 34 adjacent the link 36 and the other end of which is attached to the non-moving portion of the air motor 37. The air motors 37 are controlled by their respective valves 39 actuated by their respective cams 40 secured to the shaft 33. As previously described, the shaft 33 rotates at the speed of one-half revolution for each punching delivered at the charging station, or, one revolution for every second succeeding charge delivered. The cams 40 are so positioned on the shaft 33 that one of the levers 34 completes the ejection of a mold base from the press just prior to the operation of the slide 23, and in time for the projecting finger 25 to engage it and move it into the path of the conveyor 22.

The conveyor 22, as shown particularly in Figure 3 of the drawings, is a continuously moving endless chain, with a number of equally spaced projecting links 41 adapted to engage the mold bases 17 and move them in the guideways 42 and 43. The projecting links 41 are so positioned and their movement so timed that each mold, when released by the slide 23, is engaged by a projecting link 41 and moved towards the take-out station. The conveyor 22 is driven by the drive sprocket 44 secured to the shaft 45, and its opposite end is supported by the driven sprocket 46 secured to the shaft 47 mounted in suitable bearings 48.

Each mold base 17 is moved to the ends of the guideways 42 and 43 and released by the conveyor 22 while in the path of the cross-conveyor 49. This cross-conveyor, as shown particularly in Figure 5 of the drawings, is similar to the previously described cross-conveyor 18, and is actuated by the double acting air motor 50 controlled by the valve 51 actuated by the cam 52; and the mold base 17, deposited by the conveyor 22, is moved by it out of the path of the following mold and towards the take-out station. The conveyor 49 comprises a horizontally disposed slide 53 attached to the movable portion of the air motor 50 and suitably guided by the guide member 54. Pivotally mounted on the slide 53 are a number of upwardly projecting fingers 55 adapted to engage the mold bases when the slide is moved in the forward direction. When the slide is moved in the reverse direction the fingers contact with the bottoms of the mold bases and pivot to pass beneath them. The springs 56 are adapted to return the fingers to mold engaging position when such passage is completed. The cam 52 is so constructed that when the slide has completed the forward movement the air motor 50 is reversed and the slide is returned to its initial position. The movement of the slide 53 is limited and when the mold has been moved twice, from the position in which it was deposited by the conveyor 22, it is in position at the take-out station and the finished article may be removed from the mold; the third movement carries the mold base into the path of the conveyor 57.

The conveyor 57 is similar to the conveyor 22, and is a continuously moving endless chain, with a number of equally spaced projecting links 58 adapted to engage the mold bases 17 and move them in the guideways 59 and 60. The projecting links are so positioned and their movement so timed that each mold base, when it is released by the slide 53, is engaged by the approaching projecting link 58, moved to the ends of the guideways 59 and 60 and released in the path of the previously described cross-conveyor 18, which moves it to the charging station. The conveyor 57 is supported at one end by the driven sprocket 61 secured to the shaft 62 mounted in bearings 63; and at the other end by the drive sprocket 64 secured to the shaft 65 mounted in the bearings 66. Secured to the shaft 65 is the toothed gear 67, which supplies the necessary power to drive the conveyor.

Two pressing stations have been positioned adjacent the normal path of travel for the mold bases, as shown in Figures 1 and 6 of the drawings, and the mold bases are selectively distributed to these pressing stations, as previously described.

Each pressing station has a forming plunger die 68, which is adapted to co-act with the mold base 17 to form the glass article. A centering device 69 is provided to contact with the mold base, when in pressing position, to insure alignment of the mold and the plunger die. The press, shown in Figure 6 of the drawings, is a commonly used type of press, comprising a vertically disposed shank 70, suitably guided in the bearing 71, the lower end of which supports the plunger die 68, and the upper end of which is attached to the link 72. Attached to the upper end of the link 72 is one end of the horizontally disposed rocker arm 73, pivoted at 74, and the other end of which is connected to the vertically positioned single acting air motor 75, by means of the connecting rod 76. The air motor 75 is actuated in the upward direction by air under pressure admitted thereto by the control valve 77, which is actuated by the cam 78 secured to the shaft 33; and it is returned to its initial position, when the air is released, by the spring 79, one end of which is attached to the rocker arm 73 adjacent the pivot 74, and the other end of which is attached to the frame of the press. The cam 78 is constructed to maintain the air under pressure to the air motor for a predetermined period of time, in order that the article may be completely formed in the mold. This period of time may exceed the period of time between successive punching operations, but must be less than twice that period. The cams 78 are so positioned on the shaft 33 that the presses are alternately actuated at equal intervals of time, and are actuated immediately after each mold unit has been delivered by the oscillating movement of the lever 27.

The control valves, as shown in the drawings, are a commonly used piston type valve for controlling air motors. There are two groups; valves 39, 39, 77 and 77 are used for controlling single acting air motors, and valves 14, 20, 31, and 51 are used for controlling double acting air motors.

The valves for the double acting air motors, as shown in Figure 7 of the drawings, comprise a body portion with ports 80 and 81 located at opposite ends and on opposite sides thereof, and connected by piping 82 to a suitable source of supply of air under pressure, not shown. Aligned with the ports 80 and 81, and positioned on opposite sides of the body therefrom, are exhaust ports 83 and 84. Intermediate the ports 80 and 83 and aligned with them is the port 85 connected with one end of the air motor; and connected with the other end of the air motor is the port 86, which is positioned intermediate the ports 81 and 84 and aligned with them. The piston valve is movable in the valve body and is held in contact with its previously described cam by means of the spring 87. The piston valve contains ports 88 and 89 positioned to align respectively with the group of ports 80, 83 and 85, and the group 81, 84 and 86; and when the piston valve is in its extreme forward or back position two ports of each of these groups are communicatingly connected. Thus, the position of the piston valve determines the end of the air motor that is connected with the source of supply of air under pressure, while the opposite end is connected with the atmosphere.

The valves for the single acting air motors are similar to the valves described, except that a single series of ports are supplied in the valve body and a single connecting port in the piston valve. The valve body is provided at one end with the port 90 connected by the piping 82 with the source of supply of air under pressure. At the opposite end and aligned therewith is the exhaust port 91, leading to the atmosphere. Intermediate the ports 90 and 91 and aligned therewith is the port 92 connected by suitable piping to one end of the air motor. The piston valve has a single port 93 adapted to register with the ports 90 and 92, or the ports 91 and 92; thus, the position of the piston valve determines whether the air motor is connected with the source of supply of air under pressure, or with the atmosphere.

The timing of the various conveyors, pushing and pressing mechanisms, as shown diagrammatically in Figure 7 of the drawings, is accomplished by the established relation between the driving mechanisms and the control cams for the air motors. The shaft 45 is continuously rotated by its gear 94, from a suitable source of power, at the speed of one-half revolution for each punching operation. The chain drive 95 rotates the shaft 96 at the speed of one revolution for each punching operation. Secured to the shaft 96 is the cam 21 and the toothed gear 97 meshed with the toothed gear 67 for driving the conveyor 57. The drive chain 9 is also secured to the shaft 45 and drives the strip conveyor 3 at the speed of one carrier plate for each punching operation. Secured to the shaft 45 is the toothed gear 98 enmeshed with the toothed gear 99 of the shaft 100 to which is secured the cam 52. The gearing is so arranged that the cam 52 is rotated at the speed of one revolution for each punching operation. Also secured to the shaft 45 is the sprocket 44 for driving the conveyor 22; the driven end of which is supported by the shaft 47. Secured to the shaft 47 is the toothed gear 101 enmeshed with the toothed gear 102 secured to the shaft 33, and these gears are so proportioned that the shaft 33 is rotated at the speed of one-half revolution for each punching operation, as all the cams secured thereto operate mechanisms for alternate successive molds, excepting the cam 15 for operating the punch. This cam is provided with two operating throws, which operate the valve 14 twice in each complete revolution. The other cams have a single cam throw.

The various movements of the conveyors and cams are correlated as described, and the sprockets and cams are secured to their respective shafts in such a manner that each conveyor element will move and transfer a mold base to the following conveyor element, so as to produce a sequential movement of the series of mold bases, and the desired period of rest at each transfer station. The periods of rest may be of predetermined duration at each of the transfer stations, to insure proper time for any desired operation.

What I claim is:

1. In a machine for forming glass articles, means for forming a strip of plastic glass, means for moving said strip in a non-horizontal path, a plunger perpendicularly disposed to said strip for removing a measured portion from said strip, and a mold portion positioned to receive said measured portion, the axis of said mold portion being angularly disposed relative to the axis of said plunger.

2. In a machine for forming glass articles, means for forming a strip of plastic glass, and a punch for removing measured portions from said strip, the cutting edge of said punch being so constructed that each of said measured portions is progressively severed from said strip.

3. In a machine for forming glass articles, means for forming a strip of plastic glass, and a punch with its axis perpendicular to said strip, the cutting edge of said punch being in a plane inclined to said strip.

4. In a machine for forming glass articles, the combination of means for forming and supporting a strip of plastic glass, a punch, means for operating the punch in a direction perpendicular to the strip and thereby removing measured portions from the strip, and a portion of a mold out of alignment with the punch and positioned to receive said portions as they are removed from the strip.

5. In a machine for forming glass articles, the combination of means for forming a strip of plastic glass, means for supporting said strip in an inclined position and moving it in the direction of its length in an inclined path, a punch positioned over said path, means for operating the punch downwardly and thereby removing measured portions from said strip while the latter is in said inclined position, and a horizontally disposed mold portion beneath the punch in position to receive said measured portions as they are removed from said strip.

6. In a machine for forming glass articles, means for forming a strip of plastic glass, a carrier providing a supporting surface for said strip, said carrier being formed with openings therein exposing surface areas of the glass of predetermined size and shape, means for directing a heating medium through said openings and causing a localized heating of the portions of the strip defined by said openings, and means for cutting said heated portions from the strip in the form of blanks of said size and shape.

7. In a machine for forming glass articles, means for forming a ribbon of plastic glass, a punch constructed and operable to remove formed blanks of predetermined size and shape from said ribbon, a mold to receive said blanks and shaped to correspond to the shape of the blanks, a mold plunger in spaced relation to said punch and shaped to correspond to the shape of the punch and blanks, means for moving the mold into register with the plunger, and means for actuating the plunger.

8. In a machine for forming glass articles, means for forming a flat ribbon-like strip of plastic glass, a punch movable toward and from the strip and shaped to punch therefrom formed blanks of predetermined size and shape, and a pressing plunger effective to engage and shape the same surface of the blank as that which faces the punch and is defined thereby during the punching operation, said plunger being operative while the punch is in an inoperative position.

9. The process of forming glass articles which comprises, forming a strip of plastic glass and causing it to travel in the direction of its length in a plane inclined to the horizontal, extracting measured portions of glass from the strip at intermediate points along its length, and selectively diverting said portions to a plurality of forming stations.

10. The process of forming glass articles which comprises, forming blanks having a peripheral contour of predetermined size and shape by punching the blanks from a ribbon of glass with a cutting action which is progressive along the periphery of the blank and extends around the blank, and shaping the blanks.

11. The process of forming glass articles which comprises, forming a ribbon-like strip of plastic glass, extracting blanks of predetermined shape from said strip by use of a punch, delivering said blanks, after said extraction, to molds of a shape corresponding to that of the blanks, moving said molds into register with a mold plunger spaced from the punch, and causing the plunger to shape the blanks to the molds.

12. In a machine for forming glass articles, means for feeding a strip of plastic glass past a charging station, a punch at said station constructed to extract from said strip, blanks of glass of predetermined shape, a series of molds movable in a common path and brought in succession to the charging station, means for operating the punch in timed relation to the arrival of the molds at the charging station and causing the blanks to enter the molds, and a plunger operating independently of the punch and co-operating with the molds to shape the blanks therein.

13. In a machine for forming glass articles, means for moving a strip of plastic glass in an inclined plane past a charging station, a punch constructed and arranged to extract blanks of predetermined shape from said strip at the charging station, a series of molds movable in a common path past said station to receive said blanks, and a plunger spaced from the punch and operating independently thereof for shaping the blanks in the molds.

14. In a machine for forming glass articles in molds, a punch for severing flat discs from a flat strip of plastic glass, said punch having an annular severing edge defining the margins of said discs, molds positioned in spaced relation to said punch when it is in extended position and positioned to receive said discs of plastic glass after the discs are severed, and a plunger to coact with said discs to form glass articles in the molds.

15. Apparatus for forming glass articles, comprising the combination of means for forming a flat strip of plastic glass of predetermined cross-sectional shape and size, means for punching formed blanks of predetermined size and shape from said strip and causing each said blank after the said punching operation is completed, to be delivered to one of a series of molds movable in a common path, and means for initially pressing glass articles from said blanks while in the said molds, said punching and pressing means being independent mechanisms.

16. The process of forming glass articles in molds, which comprises forming a strip of plastic glass, severing from intermediate portions of the said strip, blanks of predetermined size and shape, causing the blanks as they are severed to drop by gravity and while unconfined, into forming molds, moving the molds with the blanks therein to an article forming position, and molding the blanks in the molds, said severing and molding operations being independent and in spaced relation.

17. A machine for forming glass articles comprising, in combination, a circular mold, a punch having an annular severing edge of less diameter than the diameter of the mold cavity, said mold having non-partible side walls, means for actuating the punch and causing it to sever a blank from a strip of plastic glass and deliver it to the mold, the mold being positioned to receive the blank centrally thereof, and a pressing plunger constructed to form one surface of the mold cavity and cooperating with the mold to press the blank to the shape of the mold.

18. The process of forming glass articles in molds, which comprises forming a ribbon of plastic glass and causing the ribbon to extend in a direction at a substantial angle to the vertical, extracting blanks of predetermined size and shape from intermediate portions of the ribbon by a punching action directed toward the upper surface of the ribbon and by which the blanks during said extraction are moved downwardly relatively to the ribbon and released therefrom, causing said blanks as they are released from the ribbon to drop bodily and unrestrictedly while unconfined, through space from the ribbon to forming molds, and molding glass articles from said blanks in the forming molds.

ALBERT N. CRAMER.